United States Patent [19]
Cohn et al.

[11] Patent Number: 5,379,589
[45] Date of Patent: Jan. 10, 1995

[54] POWER PLANT UTILIZING COMPRESSED AIR ENERGY STORAGE AND SATURATION

[75] Inventors: Arthur Cohn, Palo Alto, Calif.; David J. Minderman, Westlake, Ohio

[73] Assignee: Electric Power Research Institute, Inc., Palo Alto, Calif.

[21] Appl. No.: 124,572

[22] Filed: Sep. 20, 1993

Related U.S. Application Data

[63] Continuation of Ser. No. 42,458, Apr. 5, 1993, abandoned, which is a continuation of Ser. No. 716,541, Jun. 17, 1991, abandoned.

[51] Int. Cl.[6] .............................................. F02C 7/00
[52] U.S. Cl. ................................. 260/39.59; 60/727; 60/728
[58] Field of Search ............... 60/39.04, 39.05, 39.511, 60/39.55, 39.59, 39.17, 727, 728

[56] References Cited

U.S. PATENT DOCUMENTS

| | | | |
|---|---|---|---|
| 2,186,706 | 1/1940 | Martinka . | |
| 4,077,748 | 3/1978 | Potz . | |
| 4,441,028 | 4/1984 | Lundberg . | |
| 4,522,024 | 6/1985 | Zaugg | 60/728 |
| 4,523,432 | 6/1985 | Frutschi | 60/727 |
| 4,537,023 | 8/1985 | Nakamura et al. . | |
| 4,630,436 | 12/1986 | Frutschi | 60/727 |
| 4,686,822 | 8/1987 | Frutschi . | |
| 4,785,622 | 11/1988 | Plumley et al. . | |
| 4,819,423 | 4/1989 | Vershure, Jr. et al. . | |
| 4,823,546 | 4/1989 | Cheng . | |
| 4,829,763 | 5/1989 | Rao . | |
| 4,872,307 | 10/1989 | Nakhamkin . | |
| 4,885,912 | 12/1989 | Nakhamkin | 60/727 |
| 4,899,537 | 2/1990 | Cheng . | |
| 4,942,736 | 7/1990 | Bronicki . | |

FOREIGN PATENT DOCUMENTS 0018482  5/1973  France ...................... 60/39.55

Primary Examiner—Richard A. Bertsch
Assistant Examiner—M. Kocharov
Attorney, Agent, or Firm—Flehr, Hohbach, Test, Albritton & Herbert

[57] ABSTRACT

An improved power plant employing a combination of compressed air storage and saturation (simultaneous heating and humidification) of compressed air is disclosed. The power plant includes a combustor which provides hot gas for driving a turbine. The turbine is used in conjunction with a generator to generate electrical power. The power from the turbine is accessible by a compressor system during low power demand periods. The compressor system is used to compress air which is stored in an air storage chamber. The compressed air from the air storage chamber is used by the combustor during high power demand periods, while the compressor system is shut down, to provide compressed combustion gas to the turbine. To enhance the efficiency of the plant, while further lowering the capital cost of the plant, a saturator is positioned between the storage chamber and the combustor. The saturator receives compressed air from the storage chamber and simultaneously heats and humidifies it. The resultant heated and humidified compressed air is then conveyed to the combustor, typically after further heating by a recuperator.

9 Claims, 5 Drawing Sheets

POWER PLANT UTILIZING COMPRESSED AIR ENERGY STORAGE AND SATURATION

This is a XX continuation of application Ser. No. 08/042,458 filed Apr. 5, 1993, which is a continuation of patent application Ser. No. 07/716,541 filed Jun. 17, 1991, now abandoned.

BRIEF DESCRIPTION OF THE INVENTION

This invention relates generally to an improved power plant. More particularly, this invention relates to a method and apparatus for enhancing the operation of a power plant by utilizing a combination of compressed air energy storage and saturation (simultaneous heating and humidification) of compressed air with water vapor.

BACKGROUND OF THE INVENTION

The power output demand on a power plant grid system varies greatly during the course of a day or week. During intermediate and high demand periods, typically between 7:00 a.m. and 11:00 p.m. on weekdays, the value of electric power is comparatively high. In contrast, during the low demand periods, typically on weekends and between 11:00 p.m. and 7:00 a.m. on weekdays, the value is relatively low. Thus, for the low demand periods, it would be highly advantageous to find an efficacious way to (1) store the mechanical, thermal, and/or electrical output of an individual power plant, or (2) store the electrical output produced by other power plants on the grid. The stored power could then be economically used during high demand periods.

One approach to storing power generated during low demand periods involves the operation of compressors during these periods. The compressors produce compressed air which possesses mechanical and thermal energy which can be stored. The compressed air from storage may be utilized by the power plant at a later time while the compressors are shut down. While this approach realizes certain benefits, there are still some deficiencies associated with it.

First, the capital cost and operating costs of compressors are high. Another issue relates to the practical requirement of cooling the compressed air before storage and then heating the compressed air after it is removed from storage. This heating is generally accomplished through recuperation and combustion of a carbonaceous fuel, which is expensive and results in the emission of pollutants. Prior art compressed air storage plants, even those with recuperators, do not utilize the exhaust thermal energy as efficiently as possible. The amount of carbonaceous fuel consumption, and hence emissions, can be reduced through a more efficient use of exhaust thermal energy generated in the power plant.

These problems associated with compressed air storage have precluded the use of compressed air storage in fuel processing power plants (i.e., power plants with a major fuel processing system, such as a coal gasification power plant). There are a number of problems associated with fuel processing power plants which could be solved through proper utilization of a compressed air energy storage facility. One problem associated with fuel processing power plants relates to the high capital cost associated with fuel processing equipment. It would be advantageous to eliminate the fuel processing equipment associated with providing power to the compressor during high demand periods. Another issue with fuel processing power plants relates to altering the power output during the course of a day to address high demand and low demand periods. It would be advantageous to operate such a power plant such that it approaches a steady state condition.

OBJECTS AND SUMMARY OF THE INVENTION

Thus it is a general object of the present invention to provide an apparatus and method for utilizing the combination of compressed air energy storage and air saturation in a power plant.

It is a related object of the present invention to incorporate a compressed air energy storage feature in fuel processing power plants in order to reduce their specific cost and improve their operating flexibility.

It is another related object of the present invention to more efficiently utilize compressed air energy storage designs by incorporating a saturator.

It is another object of the present invention to utilize the combination of compressed air energy storage and air saturation to reduce the capital and generation costs of power plants.

It is yet another object of the present invention to provide a power plant which operates in a more balanced manner throughout high demand and low demand periods.

It is another object of the present invention to realize high power output without an increase in the combustion of carbonaceous fuels.

It is a related object of the present invention to provide a power plant which reduces the emission of pollutants.

It is yet another object of the present invention to provide a power plant which efficiently recycles exhaust thermal energy and all other available thermal energies.

It is another object of the present invention to provide a power plant with a saturator which uses thermal energy from a number of sources.

It is another object of the present invention to provide a power plant with less compressor mass flow for a given power output.

These and other objects are obtained by a method and apparatus for producing power in accordance with the present invention. The power plant includes a combustor which provides hot gases for driving a turbine. The turbine is used in conjunction with a generator to generate electrical power. The power from the turbine is accessible by a compressor system, typically utilized during low power demand periods. The compressor system is used to compress air some of which is stored in an air storage chamber. The compressed air from the air storage chamber is used by the combustor during high power demand periods to provide compressed combustion gas to the turbine. To enhance the efficiency of the plant, while further lowering the capital cost of the plant, a saturator is positioned between the storage chamber and the combustor. The saturator receives compressed air from the storage chamber and simultaneously heats and humidifies it. The resultant heated and humidified compressed air is then conveyed to the combustor, typically after further heating by a recuperator.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

Figure 1:
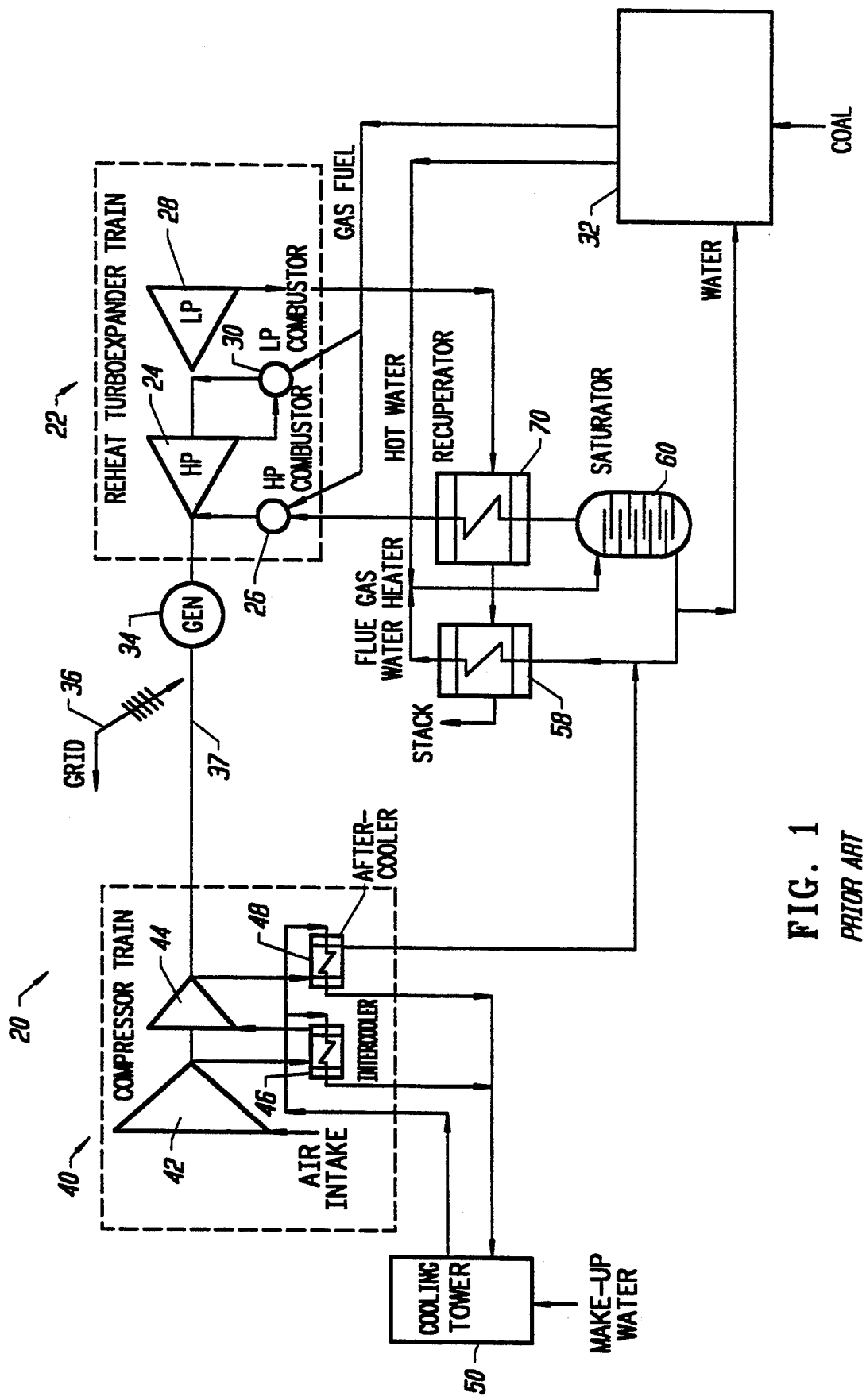
FIG. 1 is a fuel processing power plant in accordance with the prior art.

Turning now to the drawings, wherein like components are designated by like reference numerals in the various figures, attention is initially directed to FIG. 1. FIG. 1 depicts a power plant 20 in accordance with the prior art. More particularly, FIG. 1 depicts a power plant with a fuel processing system. In accordance with the prior art, the power plant 20 includes a turbine assembly 22 with a high pressure turbine 24 and a high pressure combustor 26. The turbine assembly 22 may also include a low pressure turbine 28 and a low pressure combustor 30. The combustors 26, 30 are fed by a fuel processing system 32, for instance, a coal gasification system.

The turbine assembly drives a generator 34. In turn, the generator 34 is coupled to grid 36 and shaft 37. Shaft 37 continuously drives a compressor system 40. Compressor system 40 includes a low pressure compressor 42 and a high pressure compressor 44. Preferably, low pressure compressor 42 is coupled to an intercooler 46 to remove some of the thermal energy of compression. The continuous output of high pressure compressor 44 is preferably coupled to aftercooler 48 which removes additional thermal energy from the resultant continuous compressed air stream. In accordance with prior art techniques, the resultant compressed air stream, flowing continuously and directly from the compressor system, may be conveyed to a saturator 60 and recuperator 70 before being fed to combustor 26. It should be noted that the saturator 60 is more effective if used in conjunction with aftercooler 48. The overall benefit of the saturator is marginal in the prior art because the aftercooler 48 removes thermal energy from the compressed air stream exiting the compressor system 40.

Figure 2:
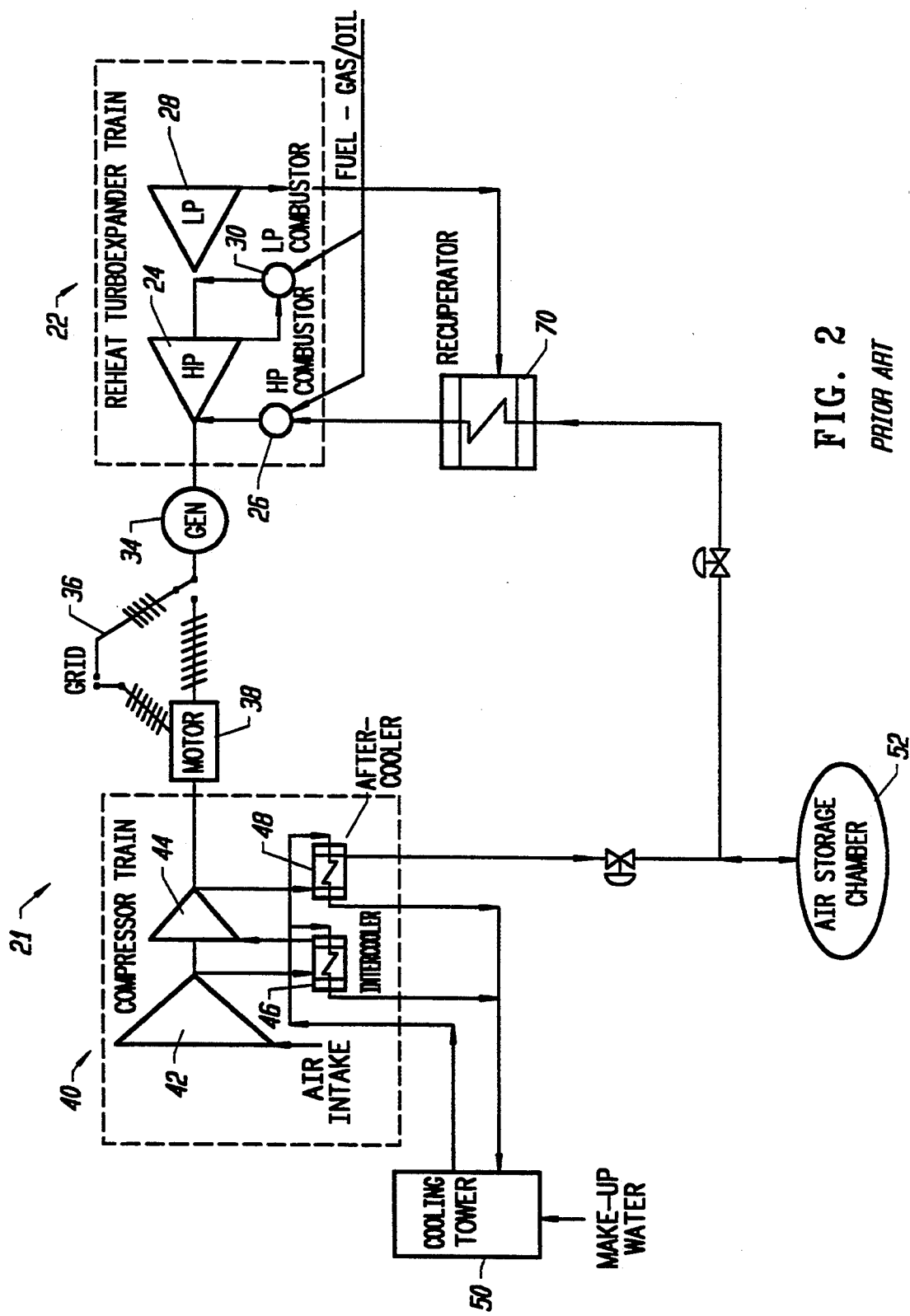
FIG. 2 is a compressed air energy storage power plant in accordance with the prior art.

Turning to FIG. 2, a compressed air energy storage (CAES) power plant 21, in accordance with the prior art, is depicted. During low power demand periods, energy may be drawn from the grid 36. This energy may be utilized by motor 38 to drive the compressor system 40.

The compressed air stream produced by compressor system 40 contains mechanical and thermal energy. The stream is processed through aftercooler 48, which withdraws most of its thermal energy. This is required so that the air will be cold enough to be compatible with a practical air storage chamber. The cold air stream is conveyed to air storage chamber 52. Thus, the air storage chamber 52 serves to store the mechanical energy of the compressed air. This energy may be utilized when the compressor system 40 is shut down at times of high power demand. The energy may be utilized in conjunction with the fuel fed to the turbine assembly 22. Specifically, the compressed air from storage chamber 52 is conveyed to combustor 26 through the appropriate configuration of the valves 54, as is known in the art.

In accordance with the present invention, the prior art power plants of FIGS. 1 and 2 are enhanced by utilizing a combination of air storage and saturation. More particularly, the fuel processing power plant of FIG. 1 is modified to include an air storage chamber, in addition to other complementary elements, and the CAES power plant of FIG. 2 is modified to include a saturator, in addition to other complementary elements.

The combination air storage and saturation power plant of the present invention yields a number of advantages. As to be more fully described herein, this configuration, in conjunction with fuel processing equipment, enables a balanced and continuous operation of a power plant while meeting variable power demands. In addition, the apparatus and method of the present invention more fully exploits thermal energy sources of the power plant. This allows smaller fuel processing equipment and compressors; thus, the capital costs of the power plant may be reduced.

By conveying the pressurized air stream from the air storage chamber to the saturator, the turbine assembly of the present invention receives a heated and humidified air stream with a greater mass flow and greater thermal energy. The higher mass flow and higher thermal energy provided by the saturator reduce the amount of energy needed for compression and thus the fuel required to provide the compression. Thus, the teaching of the present invention reduces fuel consumption and the emissions which result from fuel consumption.

Figure 3:
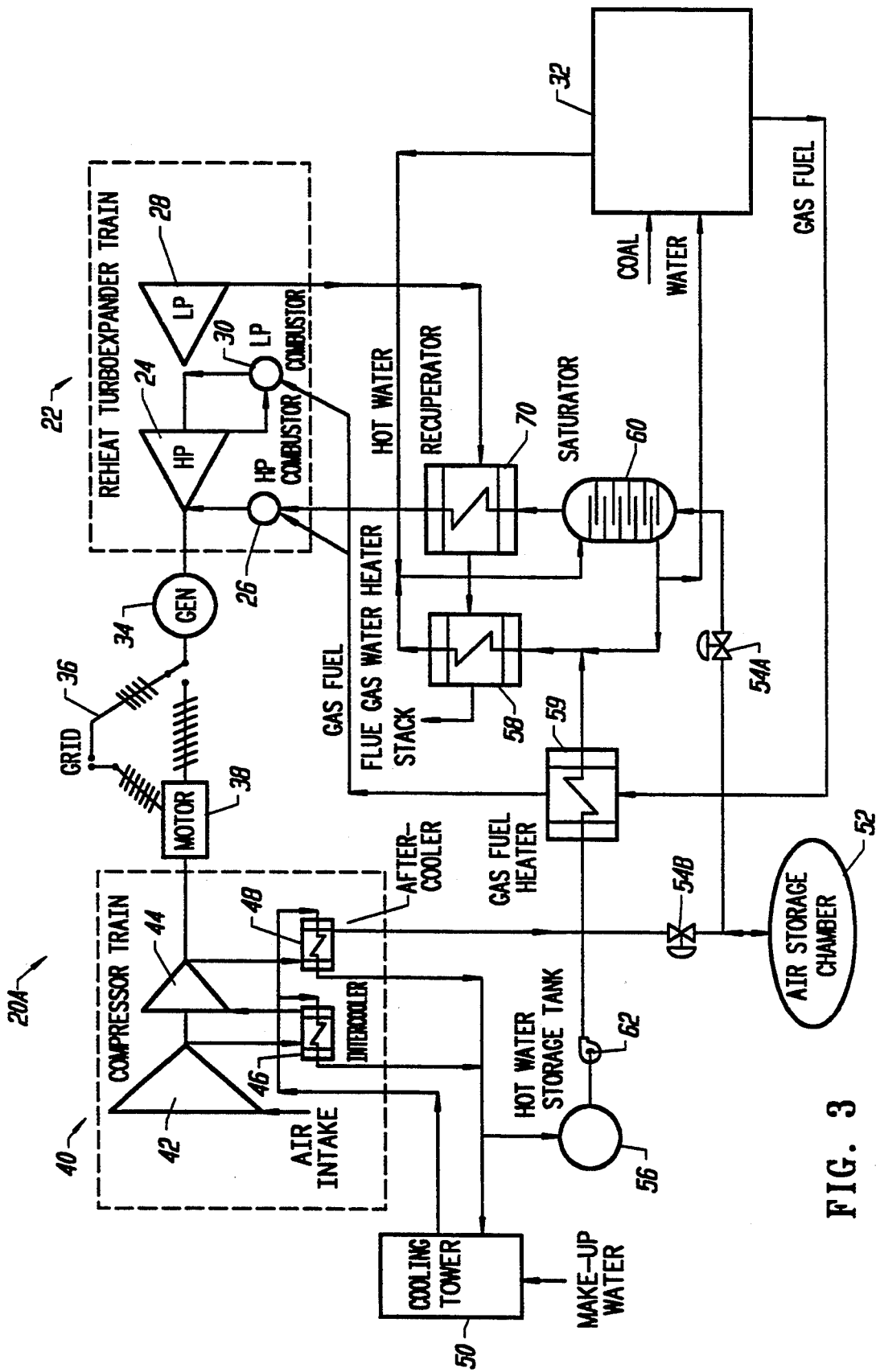
FIG. 3 is one embodiment of an improved power plant in accordance with the present invention.

Having disclosed the general concept and advantages of the present invention, attention turns to FIG. 3 which depicts a specific embodiment of an enhanced fuel processing power plant 20A, in accordance with the present invention.

As to be more fully described herein, the fuel processing power plant 20A of the present invention contains a combination of air storage, fuel processing, and saturation. As used herein, the term saturation refers to the simultaneous heating and humidification of air.

The power plant 20A includes a turbine assembly 22 which may run continuously. During low-demand time periods, the turbine assembly 22 may produce more power than is required by grid 36. In these periods, some or all of the power of the turbine assembly 22 is applied to motor 38 rather than to grid 36. Motor 38 drives a compressor system 40. The thermal energy of the compressed air is removed by heating water in the intercooler 46 and aftercooler 48. Some of the heated water from the intercooler 46 and aftercooler 48 is conveyed to hot water storage tank 56. Cooling tower 50 may also be provided to cool some of the water for reuse in intercooler 46 and aftercooler 48.

Some of the compressed air stream produced by compressor system 40 is conveyed through open valve 54B to air storage chamber 52, while the remainder goes directly to the saturator 60 through open valve 54A. The compressor system 40 is preferably sized to compress more air per unit time, while it is on, compared to that which is consumed per unit time by the turbine assembly 22. Over the full cycle of a day or week, the air storage charging and withdrawal are in balance. Thus, the air storage chamber 52 serves to store the mechanical energy of the compressed air (and the small amount of thermal energy not removed by aftercooler 48), while the hot water tank 56 stores much of the thermal energy of compression. These sources of energy may now be profitably utilized in accordance with the current invention. Most significantly, the mechanical energy within the air storage chamber 52 may be utilized at time periods of high power demand in conjunction with the fuel fed to the turbine assembly 22.

To improve the capital cost and overall heat rate of power plant 20A, in accordance with the invention, the air storage chamber 52 is coupled to a saturator 60. Specifically, the cold, compressed air from air storage chamber 52 is conveyed through open valve 54A to saturator 60, where it is converted to a heated and humidified compressed air stream. Preferably, the heated and humidified compressed air stream is then conveyed to the recuperator 70, where it is further heated. The resultant heated and humidified compressed air stream is then conveyed to the high pressure combustor 26 of gas turbine assembly 22, as is known in the art.

The saturator 60 is of the type which is known in the art. In accordance with the invention, the saturator 60 receives hot water from a number of sources. First, the saturator 60 receives hot water from fuel processing system 32. In this embodiment of the invention, the fuel processing system's thermal energy is transferred to water rather than steam. The pressurized hot water produced by the fuel processing system is fed to the saturator 60 where it is used to heat and humidify the pressurized air stream.

The saturator 60 is also preferably fed by hot water from the storage tank 56. The pressurized hot water storage tank 56 accumulates pressurized hot water during operation of the compressor system 40. The water from the hot water storage tank 56 is used to heat the fuel and then is combined with some of the drain flow from the saturator 60 and fed to flue-gas water heater 58, where it is further heated by the exhaust thermal energy from turbine assembly 22.

Thus, the saturator of the present invention effectively utilizes exhaust thermal energy from the fuel processing system 32, compressor system 40, and turbine assembly 22, and in so doing, it improves the plant efficiency.

By conveying the pressurized air stream from the air storage chamber 52 to the saturator 60, the turbine assembly 22 receives a heated and humidified air stream with a greater mass flow and thermal energy. As a result of this increased mass flow, the amount of air required by compressor system 40 is reduced. Consequently, smaller compressors may be used, and less power will be consumed while driving the compressors. The higher thermal energy of the compressed air stream provides more efficient operation of the power plant. The teaching of the present invention reduces fuel consumption and the pollutants which result from fuel consumption. Moreover, it enables use of a smaller and lower capital cost fuel processing system.

The fuel processing system 32, for instance coal gasification, typically has large thermal flows (usually originating from cooling the fuel prior to its clean-up process). A further advantage of the invention is that it makes better use of this thermal energy in the form of hot water. Since hot water is used, rather than steam, the capital cost of the fuel processing power plant is reduced.

Hot water preferably enters saturator 60 at the top, while the tepid water is mainly removed from the bottom of the saturator 60, where it is returned to flue-gas water heater 58 and reheated. Some of the water leaving the saturator 60 at various locations is recirculated to the fuel processing system 32 for cooling purposes.

Preferably, the air which leaves the saturator 60 is conveyed through a recuperator 70 in which the heated and humidified pressurized air stream is further heated before it is fed to combustor 26 of the turbine assembly 22. Recuperator 70 receives thermal energy from the exhaust gas of turbine assembly 22. The remaining thermal energy of the exhaust gas is conveyed to flue-gas water heater 58.

The operation of the power plant 20A of FIG. 3 has been described in a continuous mode. In the continuous mode, the fuel processing system 32, the turbine assembly 22, and the saturator 60 are always operating. During low demand periods, the power from the generator 34 is used to drive the compressor system 40. During high demand periods, the compressor system 40 is shut down, and the generator power goes to the grid 36, thus meeting the variable power demands. In the continuous mode, a balanced power plant, heretofore unknown in the art, is realizable. The compressor system 40 is sized so that its power demand is equal to the turbine assembly 22 output. The compressor system 40 is turned on for just enough duration during the low demand periods in the daily or weekly cycle to provide all of the compressed air required to continuously operate the turbine assembly 22.

Other modes of operation are possible as well. For instance, during the low demand periods, if the compressor system 40 mass flow rate and on-time period is configured so that the generator system does not have enough power to run the compressor system 40 by itself, additional power can be drawn from the grid 36. If, during the low demand time periods, there is an extremely cheap or low polluting source of power available from the grid 36, it may be preferable to shut down the turbine assembly 22 and use the power from the grid 36 for the motor 38.

Proper electrical connections between the generator 34, the grid 36, and the motor 38, are realized through standard switching techniques. Instead of electrical connections between motor 38 and generator 34, a single motor-generator may be used, connected to the compressor system 40 and turbine system 22 by mechanical clutches.

Figure 4:
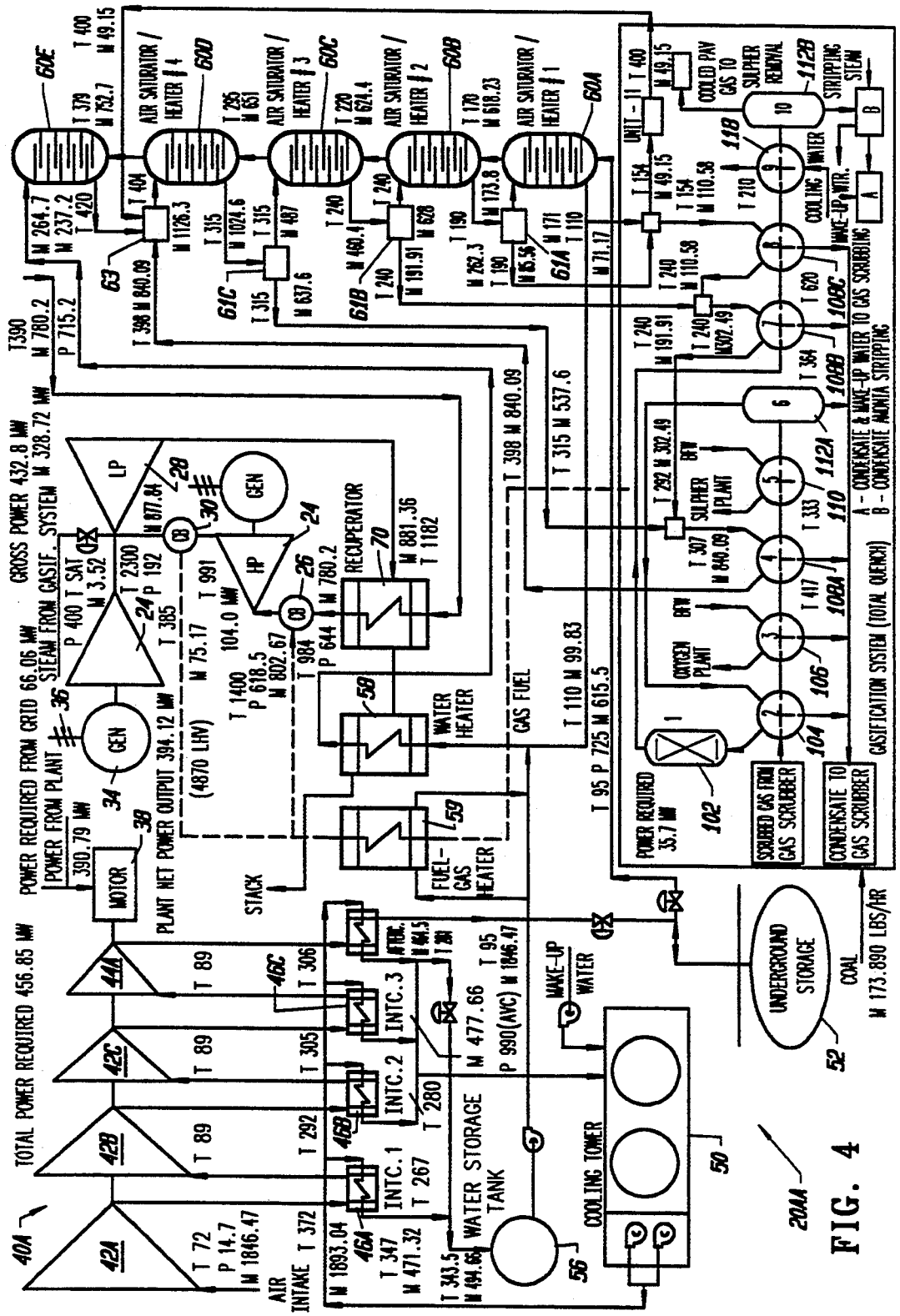
FIG. 4 is a detailed embodiment of the power plant of FIG. 3.

Turning to FIG. 4, a more detailed description of an embodiment of the present invention is provided. The power plant 20AA of FIG. 4 is conceptually identical to the power plant of FIG. 3; like components are designated by like reference numerals. The primary differences between the two embodiments are described herein.

First, the compressor system 40A includes low pressure compressor 42A, intermediate compressors 42B, 42C and a high pressure compressors 44A. A number of intercoolers 46A, 46B, and 46C are preferably provided.

Another difference between the two embodiments relates to the details disclosed in relation to a fuel processing system 32. Fuel processing system 32 is a gasification system of the type known in the art; it may include a hydrolysis reactor 102 coupled to a reactor feed preheater 104. The gasification system 32 may also include a high pressure steam generator 106 and a low pressure steam generator 110. The gasification system 32 may also include a number of air saturator/water heaters 108A, 108B, and 108C. Vapor liquid separators 112A and 112B are also utilized in accordance with prior art techniques.

An important aspect of the embodiment of FIG. 4 is the utilization of a number of saturators 60A, 60B, 60C, 60D, and 60E. Saturator 60D receives hot water directly from gasification system 32 through a mixer 63. Saturators 60C, 60B, and 60A receive hot water through splitters 61C, 61B, and 61A. Saturator 60E receives hot water directly from water heater 68.

Preferable temperatures (T), pressures (P), and mass flows (M) are indicated in FIG. 4. Temperatures are in Fahrenheit, pressures are in pounds per square inch, and mass flows are in pounds per second.

Figure 5:
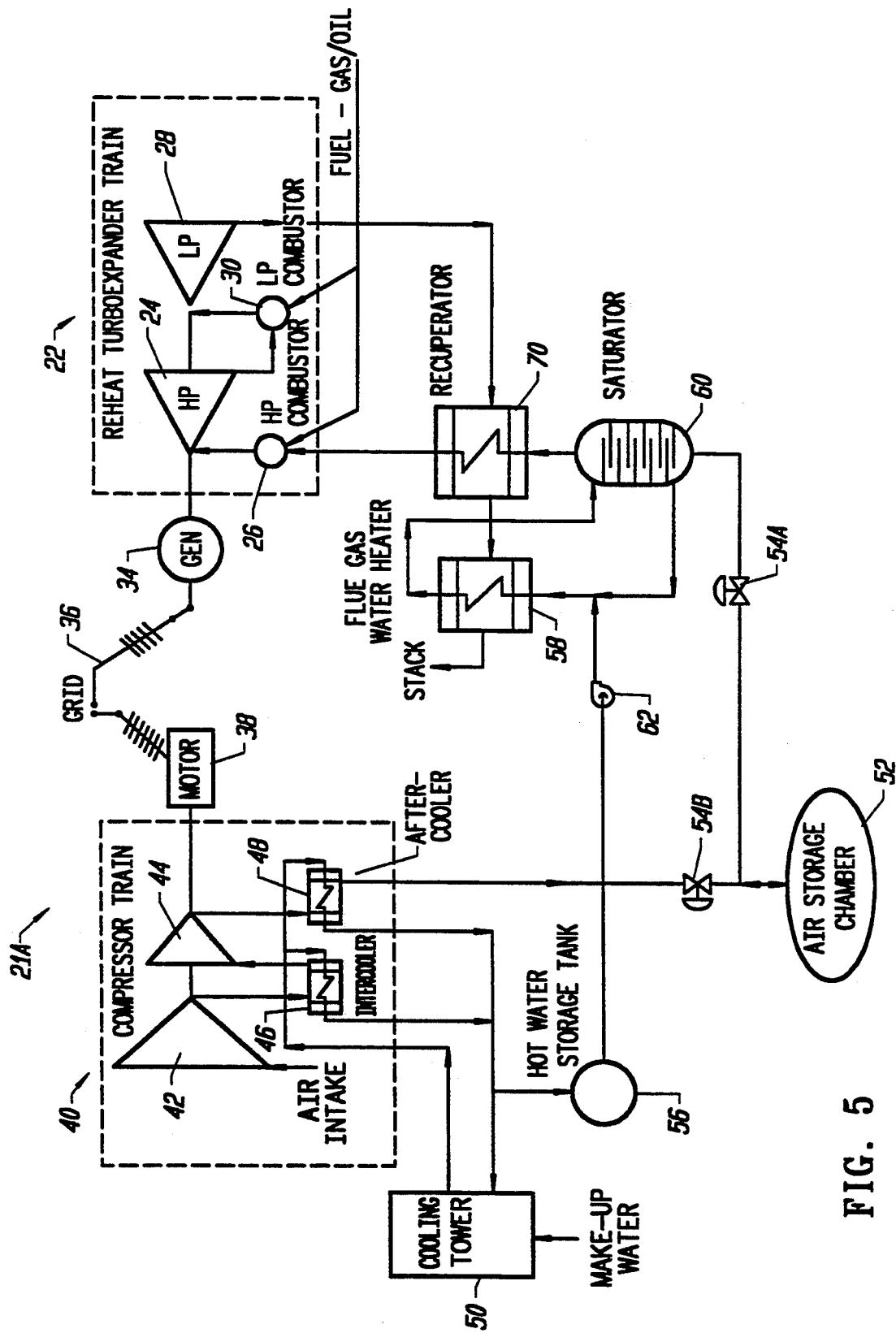
FIG. 5 is an alternate embodiment of an improved power plant in accordance with the present invention.

Turning now to FIG. 5, an alternate embodiment of the present invention with a combination of compressed air storage and saturation is disclosed. More particularly, the method and apparatus of the present invention is applied to a CAES power plant 21A. In accordance with the present invention, the efficiency of the compressed-air energy storage plant of the prior art is enhanced by utilizing a saturator 60 between the air storage chamber 52 and the recuperator 70. In contrast to the prior art, the use of a saturator 60 in the present invention is highly effective since in the prior art the aftercooler 48 was already necessary to remove most of the thermal energy of compression for practical air storage compatibility.

Specifically, with the present invention, during periods of high demand, the cold compressed air from the air storage chamber 52 is conveyed to a saturator 60 where it is converted to a heated and humidified compressed air stream. The heated and saturated compressed air stream is then conveyed to the recuperator 70 for further heating and then to a combustor of the turbine assembly 22. The hot water for the saturator 60 comes from the storage tank 56 and the return flow of the saturator 60 after further heating in the flue-gas water heater 58.

By conveying the pressurized air stream from the air storage chamber 52 to the saturator 60, the turbine assembly 22 of the present invention receives a heated and humidified air stream with greater mass flow and greater thermal energy than is obtained in prior art compressed-air energy storage plants. As a result of this greater mass flow, the amount compression required by the compressor system 40 may be reduced. Consequently, smaller compressors may be used, and less power will be consumed while driving the compressors. Thus, less energy is required to be drawn from the grid 36 in order to drive the compressor system 40. In usual American practice, the grid power is derived from burning fossil fuel, so the overall fossil fuel consumption would be reduced by the invention. Consequently, the teaching of the present invention also reduces the pollutants which result from fossil fuel consumption. Moreover, it enables use of a smaller and less costly compression system.

The combustor 26 is fed by ordinary premium fuel (e.g., distillate, natural gas) and humid, heated, high pressure air from recuperator 70. The recuperator 70 draws humidified, heated, high pressure air from the saturator 60. The saturator 60 draws cold, dry, high pressure air from the air-storage chamber 52. The turbine assembly 22 is coupled to a generator 34 which provides power to grid 36 during high demand periods.

During low demand periods, power from grid 36 may be used by motor 38 to drive compressor system 40. The cooled, compressed air produced by the compressor system 40 is conveyed to air cavity 52. In accordance with prior art techniques, the compressed air may be utilized by turbine assembly 22 at a later time. However, to enhance this subsequent use, in accordance with the invention, a saturator 60 is utilized to heat and humidify the air which leaves the air cavity 52. In one embodiment, this heated and humidified air may then be conveyed to the high pressure combustor of the turbine assembly 22. The recuperator 70 may be incorporated between the saturator 60 and the combuster 26 for improved efficiency of operation. As previously indicated, this results in a number of benefits.

The saturator 60 is of the type which is known in the art. In accordance with the invention, the saturator 60 receives thermal energy from a flue gas water heater 58 which obtains thermal energy from a number of sources.

The flue gas water heater 58 is fed by hot water storage tank 56. As previously discussed, the hot water storage tank 56 accumulates thermal energy during operation of the compressor system 40. The water from the hot water storage tank 56 is fed to flue gas water heater 58, where it is combined with tepid water draining from the saturator 60. The thermal energy source for the flue-gas water heater 58 is obtained from the exhaust thermal energy of gas turbine assembly 22. Thus, the saturator 60 of the present invention efficiently utilizes exhaust thermal energy from the compressor system 40 and from the turbine assembly 22.

Other configurations for feeding the various hot water flows to the saturator are also feasible.

During the high demand time period, pump 62 operates, and the flue-gas water heater 58 receives hot water from hot water storage tank 56. The hot water from the hot water storage tank 56 may be conveyed through gas fuel heater 59. The saturator 60 receives the pressurized air from air storage chamber 52, as the saturator valve 54A is open, and the compressor valve 54B is closed. Hot water preferably enters saturator 60 at the top, while the tepid water is removed from the bottom of the saturator 60, where it is returned to flue-gas water heater 58 and reheated.

The air which leaves the saturator 60 may be conveyed through a recuperator 70 which further heats the pressurized air stream before it is fed to combustor 26 of the turbine assembly 22. Recuperator 70 receives exhaust gas from turbine assembly 22. The remainder of the thermal energy of the exhaust gas is conveyed to flue gas water heater 58. Conversely, during low demand periods, the air storage chamber 52 receives pressurized air, while compressor valve 54B is open, and saturator valve 54A is closed.

One skilled in the art will recognize that many alternate embodiments of the present invention are feasible. The fuel processing system 32 of FIG. 3 need not be a coal gasification system. Other fuel processing techniques such as integrated liquefaction and the gasification of other fuels are also feasible, for instance, gasification of heavy oil, coke, oil shale, or tar. In addition, the combustors and fuel processor elements do not have to be discrete elements; rather, they can be integrated into a single system, such as a fluidized bed, as is known in the art. Also, the combustors may be replaced by externally heated or fired heat exchangers, as is known in the art.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. An apparatus for producing power, comprising:
   a compressor train including a plurality of compressors, said compressor train including a compressor train input side and a compressor train output side, said compressor train input side receiving ambient air and said compressor train output side discharging compressed air;
   a storage input conduit including a storage input conduit first end and a storage input conduit second end, said storage input conduit first end being coupled to said compressor train output side to receive said compressed air;
   an underground storage cavern coupled to said storage input conduit second end to receive and store said compressed air;
   a saturator input conduit including a saturator input conduit first end and a saturator input conduit second end, said saturator input conduit first end being coupled to said storage cavern to receive compressed air from said storage cavern;
   a saturator including a saturator input side and a saturator output side, said saturator input side being coupled to said saturator input conduit second end to receive said compressed air from said storage cavern, said saturator output side discharging heated and humidified compressed air;
   a combustor input conduit including a combustor input conduit first end and a combustor input conduit second end, said combustor input conduit first end being coupled to said saturator output side to receive said heated and humidified compressed air;
   a combustor with a combustor input side and a combustor output side, said combustor input side being coupled to said combustor input conduit second end to receive said heated and humidified compressed air, said combustor burning a fuel and generating a hot working fluid for discharge through said combustor output side; and
   a turbine coupled to said combustor output side, said turbine being rotated by said hot working fluid to produce power.

2. The apparatus of claim 1 further comprising a coal gasification system coupled to said combustor and delivering a gas fuel to said combustor.

3. The apparatus of claim 1 further comprising a recuperator positioned between said saturator output side and said combustor input side, said recuperator heating said heated and humidified compressed air from said saturator.

4. The apparatus of claim 3 wherein said saturator is coupled to a plurality of thermal energy sources that deliver hot water to said saturator.

5. The apparatus of claim 4 wherein said plurality of thermal energy sources include a fuel processing system.

6. The apparatus of claim 5 wherein said fuel processing system is a coal gasification system.

7. The apparatus of claim 5 wherein said fuel processing system is a fuel liquefaction system.

8. The apparatus of claim 4 wherein said plurality of thermal energy sources include a flue gas water heater, said flue gas water heater receiving exhaust heat from said recuperator.

9. The apparatus of claim 4 wherein said plurality of thermal energy sources include a hot water tank that receives pressurized hot water from an intercooler and an aftercooler of said compressor train.

* * * * *